Feb. 28, 1956 G. SINCLAIR ET AL 2,736,864

BROADBAND HYBRID NETWORK

Filed June 6, 1950 2 Sheets-Sheet 1

INVENTORS
GEORGE SINCLAIR and
ROBERT B. JACQUES
BY Philip M. Dunson
ATTORNEY

BROADBAND HYBRID NETWORK

Filed June 6, 1950 2 Sheets-Sheet 2

INVENTORS
GEORGE SINCLAIR and
ROBERT B. JACQUES
BY Philip M. Dunson
ATTORNEY

United States Patent Office 2,736,864 Patented Feb. 28, 1956

2,736,864

BROADBAND HYBRID NETWORK

George Sinclair, Toronto, Ontario, Canada, and Robert B. Jacques, Columbus, Ohio, assignors, by mesne assignments, to Thompson Products, Inc., Cleveland, Ohio, a corporation of Ohio Application June 6, 1950, Serial No. 166,398

3 Claims. (Cl. 333—11)

The present invention relates to wave transmission systems and particularly to coupling arrangements commonly known as hybrid networks or bridge circuits for use in such systems.

An object of the invention is to provide efficient transmission of wave energy between certain of a plurality of wave transmission lines or other media in a wave transmission system while effectively preventing transmission of wave energy between others of them.

Another object is to provide balance in systems involving wave motion.

A more specific object is to couple four transmission lines or other transmission media in such manner that when wave energy is supplied to any one of them, two others of the lines will receive part of this energy while the fourth line will receive none.

Another important object is to provide a directional coupling arrangement in the nature of a hybrid network or bridge circuit that will achieve the aforementioned objects over a wide frequency range.

These and other objects and advantages will become apparent to those skilled in the art upon consideration of the detailed description herein.

In the past, three types of coupling means have been used to accomplish some of the functions of this invention. At audio frequencies, the hybrid transformer, essentially a Wheatstone bridge variation, has been used extensively. At very high frequencies, in the range of 1,000 to 30,000 megacycles, two types of hybrid network are well known. One, the Side Outlet Tee, or so-called "Magic T," utilizes a combination of waveguides brought together at a common junction. The other, the hybrid ring, or so-called "rat-race," comprises a ring of either waveguide or coaxial line provided with a plurality of outlets.

Two disadvantages of these devices are the limited frequency range over which each is capable of operating and the inherent narrow bandwidth of the higher-frequency types.

The hybrid transformer is limited to the low-frequency range where high coupling coefficients can be obtained through the use of iron cores. The practical upper frequency limit of this type unit is about 1 mc. and the frequency bandwidth over which adequate bridge action takes place is rather small, being in the order of 30 to 1.

The Side Outlet Tee is limited to the frequency range of about 1000 mc. to 30,000 mc. for practical reasons of waveguide size. Below 1000 mc. the waveguide cross-section becomes so large as to become unmanageable, and above 30,000 mc. the waveguide cross-sections become so small that it is extremely difficult to maintain the mechanical tolerances required in construction. In addition, the practical bandwidths obtained using the Side Outlet Tee are limited to the range between the lowest frequency set by the cut-off frequency of the waveguide used in the construction, and the highest frequency that the waveguide will support in fundamental mode. This limits the bandwidth to about 2½ to 1.

The hybrid ring depends upon the path length between various junctions and outlets for its bridge action and therefore is limited to a frequency range where these path lengths (which are a large portion of a wavelength) are small enough to make a practical unit in terms of size. In addition, the bandwidths obtainable with this unit are extremely small, because of the use of phase cancellation to obtain the bridge action. Usable bandwidths of more than 5% are difficult to obtain in the hybrid ring.

In the accompanying drawings, forming a part of this specification, in which like reference characters designate like parts throughout:

The invention comprises a junction of four transmission lines arranged in such manner that symmetry requires the incident wave energy on any arm of the network to divide between two of the other arms with no energy entering the fourth arm.

Figure 1:
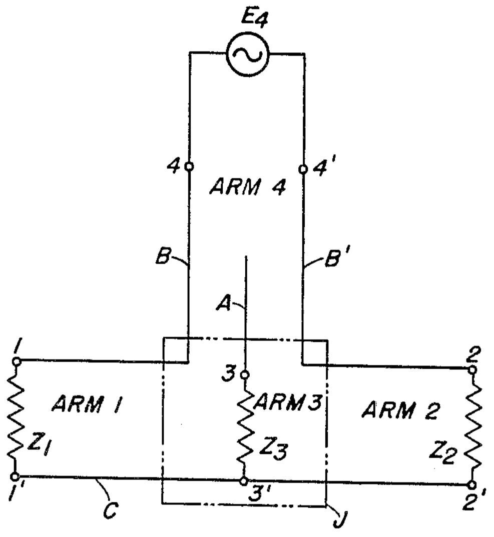
Figure 1 is a schematic diagram of a basic transmission line circuit form of the invention.

Referring first to Figure 1, it is apparent from symmetry that where arm 1 and arm 2 are of identical configuration and load impedance, $Z_1$ and $Z_2$ are equal (equality as used herein means equality in magnitude and in phase), or merely where the reflected impedances from arm 1 and arm 2 at junction J are equal, wave energy fed into arm 4 from generator $E_4$ divides equally between arm 1 and arm 2, where arm 3 and impedance $Z_3$ are not included in the circuit. When arm 3 is inserted as shown with conductor A of arm 3 midway between and parallel to, conductors B and B′ of arm 4, all points on conductor A are at a potential equal to that of point 3′. This is apparent from the fact that, from symmetry, corresponding points on conductors B and B′ of arm 4 are at all times at equal and opposite potentials with respect to point 3′. Every point on conductor A of arm 3, since it is located midway between two corresponding points on conductors B and B′ of arm 4, must be at a potential midway between the potentials on said conductor points, which mid-potential is constant and equal to the potential at point 3′. Since there is no potential difference along conductor A or between points 3 and 3′, no current flows in arm 3 or through load impedance $Z_3$, and no energy is absorbed in arm 3 or in load impedance $Z_3$.

From the theorem of reciprocity, it is obvious that with generator $E_4$ connected between points 3 and 3′ and impedance $Z_3$ connected between points 4 and 4′, instead of in their original connections, but with no change in arm 1 and arm 2, the energy from arm 3 divides equally between arm 1 and arm 2, and no energy is absorbed in arm 4 or in load impedance $Z_3$. Without depending on the reciprocity theorem, the bridge action with such connections can be understood from the fact that the field set up by generator $E_4$ connected across arm 3 produces potentials on conductors B and B′ that are different from that at point 3′, but equal to each other because conductors B and B′ are located symmetrically about conductor A. Since there is no potential difference between conductors B and B′, no current flows in arm 4 or through load impedance $Z_3$ connected across points 4 and 4′, and no energy is absorbed in arm 4 or in load impedance $Z_3$. Because of symmetry, the energy divides equally between arm 1 and arm 2.

It is possible to prove that where energy is fed into arm 1 only, and the reflected impedances from arm 3 and arm 4 at junction J are equal, the energy divides equally between arm 3 and arm 4 and no energy is absorbed in arm 2 or in its load impedance $Z_2$. Similarly, it is possible to prove that where energy is fed into arm 2 only, and the reflected impedances from arm 3 and arm 4 at junction J are equal, the energy divides equally between arm 3 and arm 4 and no energy is absorbed in arm 1 or in its load impedance $Z_1$. These two arrangements (which are really the same, as is seen from physical symmetry) are not as important as the other two, since physical symmetry makes it much more convenient to balance arm 1 and arm 2 and feed energy into either arm 3 or arm 4 than to balance arm 3 and arm 4 while feeding energy into arm 1 or arm 2.

The open-wire hybrid network of Figure 1 has some drawbacks. All parts of the system must be kept absolutely symmetrical about the axis through conductor A and the center of arm 4, since radiation from the open-wire lines and stray coupling must be kept as small as possible. Larger tolerances in construction are permissible and more stable operation is obtained by replacing the open-wire network with a shielded, coaxial type, network as shown in Figure 2, whereby radiation and stray-coupling are minimized.

Figure 2:
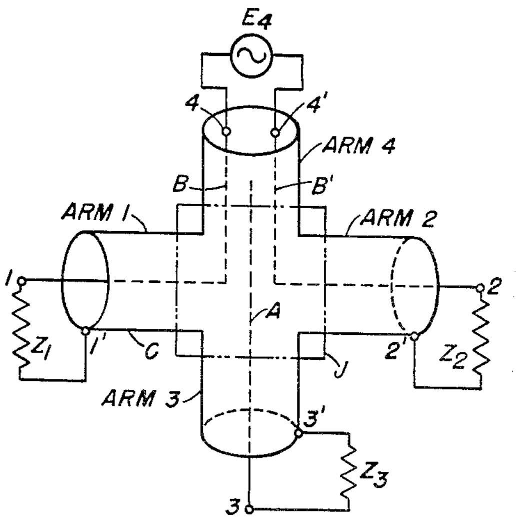
Figure 2 is a schematic plan view of another form of the invention.

The embodiment of the invention shown schematically in Figure 2 is electrically identical with that of Figure 1. Physically, the coaxial hybrid network of Figure 2 differs from the open-wire form of Figure 1 in that conductor C, on which are located points 1′, 2′, and 3′ to which load impedances $Z_1$, $Z_2$, and $Z_3$ respectively are connected, forms a tubular shield around inner conductors A, B, and B′ in the coaxial network. The description of the bridge action in the circuit of Figure 1 applies without change to the coaxial hybrid network of Figure 2.

Figure 3:
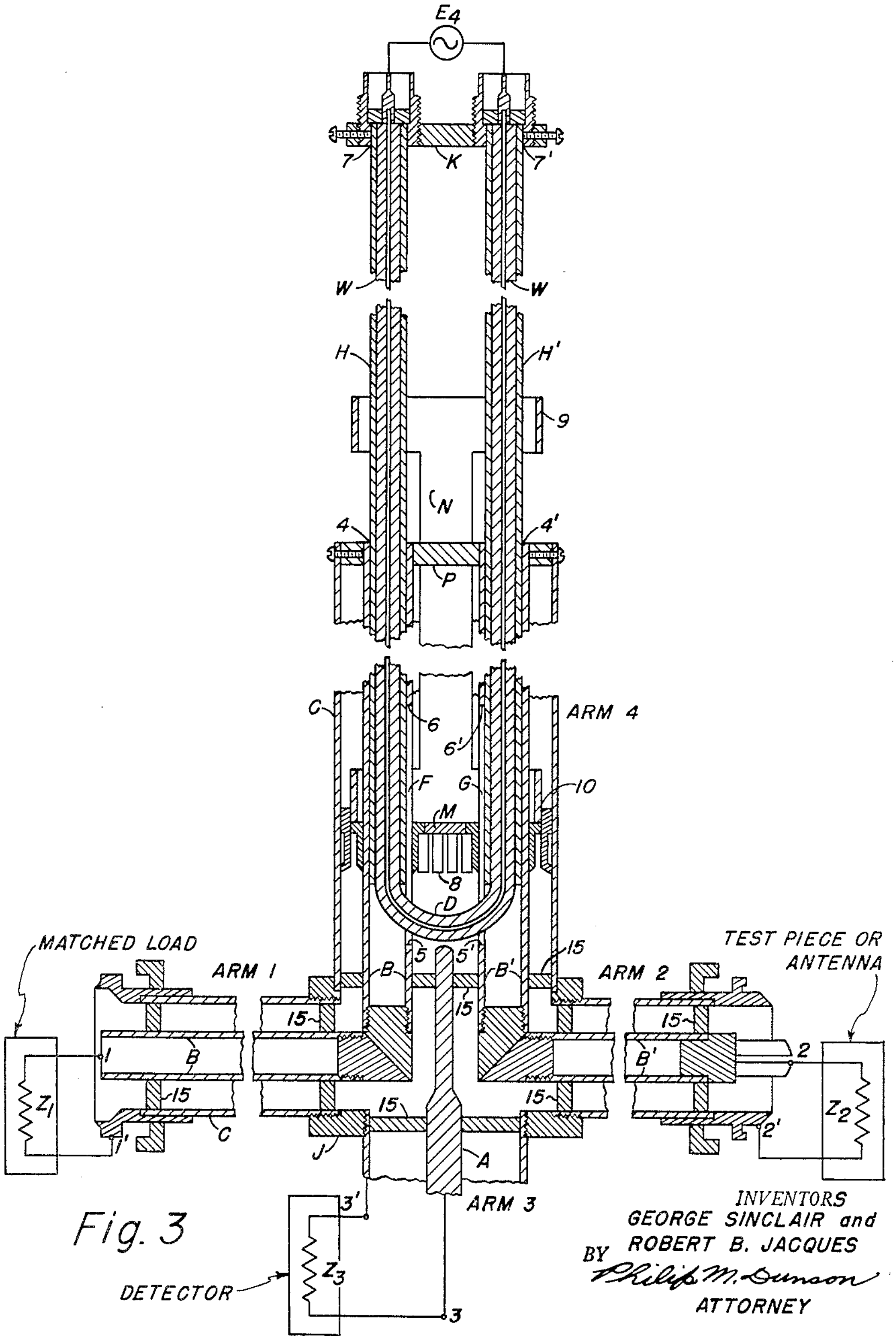
Figure 3 is a plan view in cross-section showing actual construction of an embodiment of the invention of the type shown in Figure 2.

Figure 3 shows a typical construction similar to the embodiment shown schematically in Figure 2, but providing a different means of coupling energy into arm 4. The structural details will be apparent to those familiar with coaxial lines, connectors, and tuners. Such details will be discussed only to the extent necessary to describe the coupling of energy into arm 4. Generator $E_4$ could be connected between points 4 and 4′ on conductors B and B′ respectively, just as it is in Figures 1 and 2. Figure 3 shows an alternative, but equivalent, means for feeding energy into arm 4, in which generator $E_4$ is connected to coupling loop D, from which energy is inductively coupled into conductors B and B′.

Generator $E_4$ feeds energy into coupling loop D which runs down the inside of hollow conductor B, through slot F therein, across and through slot G to the inside of hollow conductor B′, and up the inside of conductor B′. Slot F is a rectangular slot extending lengthwise along the wall of hollow conductor B from point 5 to point 6, just wide enough to permit longitudinal adjustment of the location of the transverse portion of coupling loop D between points 5 and 6. Slot G is similarly shaped and extends from point 5′ to point 6′ on the wall of hollow conductor B′. Hollow shields H and H′ around the longitudinal portions of coupling loop D make slidable fits inside hollow conductors B and B′ respectively. Non-conducting material W surrounds coupling loop D and insulates it from hollow shields H and H′ and hollow conductors B and B′. Handle K, rigidly connected to shields H and H′ at points 7 and 7′ respectively, is grasped and moved by the operator to vary the position of coupling loop D.

Slidable tuning plunger M provides, at its lower extremity 8, a short-circuit across outer conductor C and inner conductors B and B′ of arm 4. The position of plunger M is varied by grasping and moving upper portion 9 of slotted hollow cylinder N which is rigidly connected, at lower portion 10, to plunger M. Two oppositely-located longitudinal slots between upper portion 9 and lower portion 10 of hollow cylinder N provide clearance around rectangular insulating cross-member P, which supports conductors B and B′ at their upper extremities 4 and 4′ respectively, and holds conductors B and B′ in symmetrical position inside shield C of arm 4.

The positions of coupling loop D and tuning plunger M determine the impedance of generator $E_4$ as seen from arm 4. The impedance of generator $E_4$ is matched to that of arm 4, for maximum power transfer, by varying the position of coupling loop D, which controls the resistance component, and the position of tuning plunger M, which controls the reactance component. The optimum position of the short-circuit of tuning plunger M is in the vicinity of one-quarter wavelength from the transverse portion of coupling loop D.

Arm 1, arm 2, and arm 3 are constructed in a straightforward manner. Ring-shaped insulating spacers 15 are provided where necessary to support conductors A and B within outer conductor C. Bridge action in the structure of Figure 3 is identical with that described in connection with the open-wire circuit of Figure 1, for wave energy of any frequency below that at which higher-order modes would be propagated in the coaxial system.

In normal use of the hybrid network as a bridge element, wave energy is coupled into arm 4 from generator $E_4$ through coupling loop D, energizing the two-wire coaxial lines B and B′ in arm 4. A matched load $Z_1$ (no energy reflected) is connected to arm 1, a detector $Z_3$ is connected to arm 3 and an unknown test piece $Z_2$ is connected to arm 2. When the test piece $Z_2$ is matched, no energy is propagated into arm 3 or to the detector $Z_3$. When the test piece $Z_2$ is not matched, energy is reflected from it back through arm 2 to junction J where it divides between arm 3 and arm 4 (and some is propagated into arm 1 unless arm 3 and arm 4 are matched). The voltage across detector $Z_3$ is directly proportional to the reflection coefficient of the test piece $Z_2$. Hence, a measure of the impedance of the test piece $Z_2$ is obtained. A more accurate measure of the impedance of test piece $Z_2$ can be obtained by letting either $Z_1$ or $Z_2$ include a calibrated impedance transforming network and adjusting this network for balance between arm 1 and arm 2 (no energy received by detector $Z_3$). From the transformation required for balance, impedance of test piece $Z_2$ can be calculated. Since arm 1 and arm 2 are symmetrical with respect to arm 3 and arm 4, the matched load $Z_1$ can be connected to arm 2 and the test piece $Z_2$ can be connected to arm 1 with the same results.

To use the hybrid network as a directional coupler, the test piece $Z_2$ comprises any matched system in which a directional coupler is needed. The detector $Z_3$ is sensitive only to wave energy moving from this system toward junction J. In a typical application of this nature, the test piece $Z_2$ may consist of a matched wave propagating and receiving means, usually referred to as an antenna, that is used to transmit the signals from generator $E_4$ and at the same time to receive signals from remote locations. Such incoming signals, which may be echoes of the transmitted signals or may be signals originating from a remote transmitter, are the only signals that will be received by detector $Z_3$.

The coaxial hybrid network provides advantages over the Side Outlet Tee and the hybrid ring in that operation over a much larger frequency range is possible. This range extends from nearly zero cycles per second to an upper frequency limit determined only by the physical size of the unit in terms of wavelengths. A practical upper frequency limit is probably about 10,000 mc. at the present time, because of the attenuation in transmission lines above this frequency. The bandwidth of the coaxial hybrid network is the same as the total operating range or 100%. In practice the usable bandwidth is limited somewhat because matched loads are not available as broadband devices over this large frequency range. The large frequency tolerances are explainable from the facts that coaxial line systems are not limited by a cut-off frequency as are waveguide systems and that the coaxial hybrid network does not depend on phasing to maintain a bridge balance as does a hybrid ring.

The invention in the forms shown in Figures 1, 2, and 3, is not as effective at very low frequencies as it is at the higher frequencies, because the amount of energy received by arm 3 depends upon the coupling between conductor A of arm 3 and conductors B and B′ of arm 4; and this coupling, since it is essentially capacitive, decreases with decreasing frequency.

Figure 4:
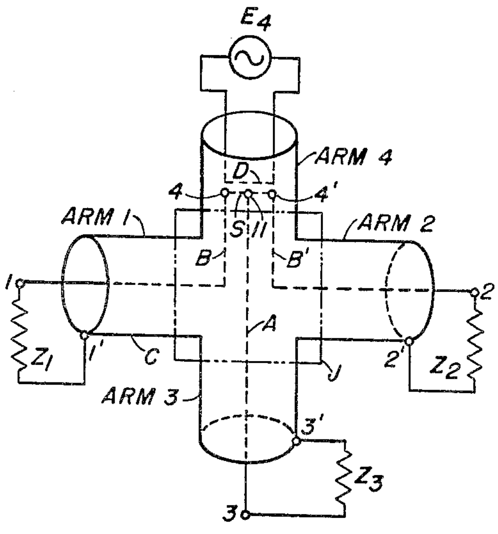
Figure 4 is a schematic plan view of a modified form of the invention.
Figure 5:
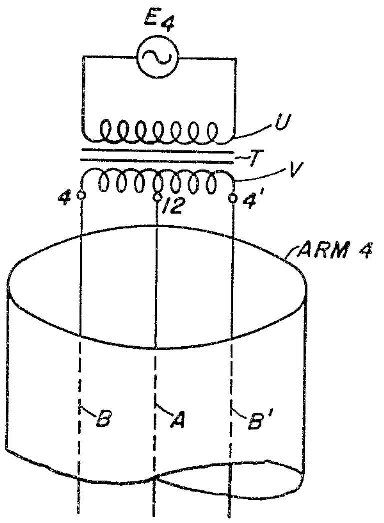
Figure 5 is a schematic diagram of a variation in the input coupling circuit.

Figures 4 and 5 show two similar forms of inductive coupling that can be used instead of the capacitive arrangement. In Figure 4, conductor S is connected between end point 4 on conductor B and end point 4′ on conductor B′. The end of conductor A is connected to center-point 11 on conductor S, providing inductive coupling between arm 4 and arm 3. Generator $E_4$ is coupled inductively to conductor S by coupling loop D. In Figure 5, generator $E_4$ is connected across primary winding U of transformer T, which may be of the type using a powdered-iron core for operation over a wide band in the low frequency region. Secondary winding V of transformer T is connected between end point 4 on conductor B and end point 4′ on conductor B′, while the end of conductor A is connected to center-tap 12 of secondary winding V, providing inductive coupling between arm 4 and arm 3 in a manner similar to that of Figure 4. Since the input to conductors B and B′ of arm 4 from generator $E_4$ is balanced with respect to conductor A and arm 3, as in the forms of the device shown in Figures 1, 2, and 3, the bridge action using the coupling means shown in Figures 4 and 5 is identical with that described in connection with Figures 1, 2, and 3.

Other methods for obtaining the coupling between generator $E_4$ and the hybrid network can be used, provided that the output of the coupling network is balanced with respect to a center-tap connection. Examples of such coupling networks for special uses include a low-pass network of O-configuration in which the output condenser is split to provide a center-tap to be connected to conductor A, as well as high-pass, band-pass, and band-elimination filters, and balanced resistance pads. The main requirement in all of the coupling methods that might be employed is that there be electrical symmetry, which is usually best obtained by mechanical symmetry.

As various changes could be made in the embodiments of this invention without departing from the spirit or scope thereof, it is intended that all matter contained in the foregoing description or shown in the accompanying drawings shall be interpreted in an illustrative, and not in a limiting, sense.

We claim:

1. A broadband hybrid network comprising a single junction of four symmetrically disposed coaxial type transmission lines of which two are diametrically opposed transmission lines and a third transmission line all three of which are comprised of a single inner conductor and a single outer conductor, respectively, the remaining, fourth, transmission line comprising two parallel inner conductors and a single outer, hollow conductor shield; the hollow outer conductor of each of the two diametrically opposed of said symmetrically disposed transmission lines connected jointly at said junction to the hollow outer conductor of the third transmission line and to a hollow shield around the fourth transmission line therefor, the single inner conductor of one of said diametrically opposed transmission lines connected at said junction to one inner conductor of said fourth transmission line; the single inner conductor of the other of said diametrically opposed transmission lines connected at said junction to the other inner conductor of said fourth transmission line whereby said two diametrically opposed transmission lines and said fourth transmission line are series connected; and a single inner conductor of said third transmission line disposed at said junction and in the vicinity thereof, said inner conductor of said third transmission line being so positioned that all points thereon are substantially equidistant from the two inner conductors of said fourth transmssion line, and a coupling loop between the inner conductors of said fourth transmission line; said loop being adjustably positionable within the hollow outer conductor of said fourth transmission line to symmetrically feed wave energy into said fourth transmission line; and the junction end of the single inner conductor of said third transmission line is extended to a balance point in the loop and is coupled thereto; and a short circuit adjustably positionable across the outer termination of the two inner conductors of said fourth transmission line.

2. A broadband hybrid network comprising a single junction of four symmetrically disposed coaxial type transmission lines, two diametrically opposed transmission lines and a third transmission line each comprising a single inner conductor and a single outer conductor, the remaining, fourth, transmission line comprising two parallel inner conductors and a single outer, hollow conductor shield; the hollow outer conductor of each of the two diametrically opposed of said symmetrically disposed transmission lines connected jointly at said junction to the hollow outer conductor of the third transmission line and to a hollow shield around the fourth transmission line therefor, the single inner conductor of one of said diametrically opposed transmission lines connected at said junction to one inner conductor of said fourth transmission line; the single inner conductor of the other of said diametrically opposed transmission lines connected at said junction to the other inner conductor of said fourth transmission line whereby said two diametrically opposed transmission lines and said fourth transmission line are series connected; and the single inner conductor of said third transmission line disposed at said junction and in the vicinity thereof, said inner conductor of said third transmission line being so positioned that all points thereon are substantially equidistant from the two inner conductors of said fourth transmission line and a coupling loop between the inner conductors of said fourth transmission line, said two parallel inner conductors of said fourth transmission line being constructed of hollow tubing; a longitudinal slot in each of said inner conductors in the portion of said hollow tubing nearest the centerline between said inner conductors, said slots providing longitudinal openings registering opposite each other on each side of said centerline; and the coupling loop comprising a conductor running down the inside of one of said hollow inner conductors, through the longitudinal slot in said hollow conductor, across, in a transverse line substantially perpendicular to said hollow inner conductors, to the longitudinal slot in the other hollow inner conductor, through said longitudinal slot, and up the inside of said other hollow inner conductor, the conductor of said coupling loop being insulated from said hollow inner conductors.

3. The broadband hybrid network of claim 2; means for adjusting the longitudinal position of the transverse portion of said coupling loop within the limits of said longitudinal slots; and a longitudinally adjustable tuning plunger providing a short-circuit across the hollow shield and said inner conductors of said fourth transmission line.

References Cited in the file of this patent

UNITED STATES PATENTS

| | | |
|---|---|---|
| 2,272,060 | Dow | Feb. 3, 1942 |
| 2,425,084 | Cork et al. | Aug. 5, 1947 |
| 2,527,979 | Woodward, Jr. | Oct. 31, 1950 |
| 2,532,736 | Sheppard | Dec. 5, 1950 |
| 2,579,751 | Muchmore | Dec. 25, 1951 |

FOREIGN PATENTS

| | | |
|---|---|---|
| 567,639 | Great Britain | Feb. 26, 1945 |